(No Model.)

H. BLUME.
WAGON JACK.

No. 427,144.    Patented May 6, 1890.

Attest:
A. N. Jesbera
E. M. Watson

Inventor:
Hermann Blume
By David A. Burr
Atty.

UNITED STATES PATENT OFFICE.

HERMAN BLUME, OF NEW YORK, N. Y.

WAGON-JACK.

SPECIFICATION forming part of Letters Patent No. 427,144, dated May 6, 1890.

Application filed October 7, 1889. Serial No. 326,202. (No model.)

*To all whom it may concern:*

Be it known that I, HERMAN BLUME, of the city, county, and State of New York, have invented a new and useful Improvement in Wagon-Jacks; and I do hereby declare that the following is a full and exact description thereof, reference being had to the accompanying drawings, and to the letters of reference marked thereon, making a part of this specification.

This invention relates to an improvement in that class of wagon-jacks which are operated by the action of a screw, and has for its object to simplify the construction and reduce the cost of such a jack and render it more readily available for ready use under all ordinary conditions.

It consists in the construction of the jack with a threaded standard, a nut running upon said standard and provided with means to facilitate turning it, and a collar revolving loosely upon the nut and adapted to be fitted and retained under an axle, all as hereinafter fully described and claimed.

Figure 1:
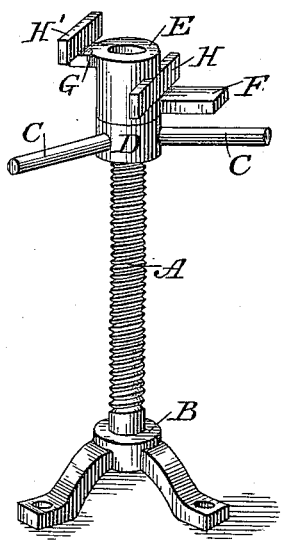
Figure 2:
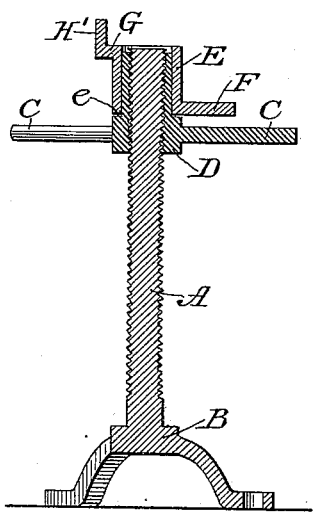

In the accompanying drawings, Figure 1 is an elevation of my improved wagon-jack in perspective, and Fig. 2 a central vertical section thereof.

A represents the standard for the jack fitted to a suitable base B, which shall serve to uphold it firmly in its upright position. Said base may be in the form of a tripod, as shown in the drawings, or of a solid plate or disk, or in other convenient form.

The standard A is threaded along its entire length, and a long nut D is fitted to run thereon, said nut being previously provided with levers C C, extending radially therefrom, by which it may be turned. A collar or sleeve E is mounted to revolve freely upon this extended nut D, the lower end of the collar being supported by a circumferential offset or shoulder *e*, formed upon the nut, as shown in Fig. 2. An arm F is made to project as an axle-support from the lower end of the collar at a right angle with its axis, and a second shorter arm G is extended in the opposite direction flush with the top of the collar.

A transverse bar H is secured to or formed integrally with the collar E at the inner end of the arm F, so as to fit longitudinally against an axle resting on the arm and thereby prevent the arm from turning under the axle, and a similar bar H' is secured upon the outer end of the upper arm G to accomplish the same end when the axle is made to rest on said upper arm.

In the use of the jack thus simply constructed the arm F is placed under the axle of the wagon to be lifted and the nut D is turned by means of the levers C C until the arm is brought into contact with the axle, the transverse bar H being fitted longitudinally against the side thereof. A further movement of the nut will now operate to lift the axle and wagon so as to free the wheel from the ground and permit its ready removal, the bar H preventing the collar or sleeve E from turning with the nut and thereby disengaging the arm F from the axle. Where the height of the axle above the ground is such as that the arm F may not be brought into engagement therewith, the standard A may be placed under the axle and the collar E run up until its upper end shall reach and bear against the axle to lift it, the bar H' preventing the collar from turning in unison with the nut D. Thus by running the collar E up or down upon the standard A by means of the nut D the collar may be readily brought into engagement with the under side of the axle of a vehicle of any description.

It is evident that the nut may be actuated by a hand-wheel or by detached rods or levers inserted into holes in the periphery of the nut, or other equivalent well-known appliances, which need not herein be particularly described.

The improved jack may be employed in lifting not only wagons, but all manner of structures or articles which will afford a bearing for the collar or its arms.

I claim as my invention—

The improved screw-jack constructed of a threaded vertical standard, a nut working upon said standard, means for actuating the same, a collar revolving loosely upon the nut, and one or more arms projecting radially from the collar, all substantially in the manner and for the purpose herein set forth.

In testimony whereof I have signed my name to this specification in the presence of two subscribing witnesses.

HERMAN BLUME.

Witnesses:
A. N. JESBERA,
E. M. WATSON.